(12) United States Patent
Goggin

(10) Patent No.: US 7,694,840 B2
(45) Date of Patent: Apr. 13, 2010

(54) STORAGE VESSEL CHAMBER FOR STORING FUELS SUCH AS HYDROGEN

(75) Inventor: Brian Anthony Goggin, Hamilton (NZ)

(73) Assignee: H2Safe, LLC, Los Angeles, CA (US)

( * ) Notice: Subject to any disclaimer, the term of this patent is extended or adjusted under 35 U.S.C. 154(b) by 973 days.

(21) Appl. No.: 10/932,983

(22) Filed: Sep. 1, 2004

(65) Prior Publication Data

US 2005/0092756 A1    May 5, 2005

(30) Foreign Application Priority Data

Sep. 1, 2003    (NZ) .................................... 527968

(51) Int. Cl.
*F17C 1/02*    (2006.01)
*B65D 1/24*    (2006.01)

(52) U.S. Cl. ..................... 220/586; 220/501

(58) Field of Classification Search ............... 220/586, 220/587, 585, 567.2, 564, 563, 4.26, 4.12, 220/669, 676, 608, 503, 901, 560.11, 88.1, 220/501, 560.06, 560.05, 560.04, 500, 555, 220/553, 581; 208/340; D9/684, 756, 737; *B60K 15/063, B60K 15/077, 15/03*

See application file for complete search history.

(56) References Cited

U.S. PATENT DOCUMENTS

| | | | | |
|---|---|---|---|---|
| 194,217 A | * | 8/1877 | Bushnell | 220/581 |
| 575,526 A | * | 1/1897 | McIntyre | 220/560.03 |
| 1,477,686 A | * | 12/1923 | Braender | 220/560.02 |
| 1,544,854 A | * | 7/1925 | Mueller et. al. | 62/48.1 |
| 1,616,008 A | * | 2/1927 | Stout | 220/563 |
| 2,001,996 A | * | 5/1935 | Whitman | 62/48.2 |
| 2,379,126 A | * | 6/1945 | Welden | 220/563 |
| 2,451,486 A | * | 10/1948 | Horton | 220/560.05 |
| 2,533,431 A | * | 12/1950 | Chausson | 220/563 |
| 2,552,119 A | * | 5/1951 | Scharenberg | 220/563 |
| 2,696,247 A | * | 12/1954 | Hiltner | 137/43 |
| 2,871,669 A | * | 2/1959 | Mann et al. | 62/48.3 |
| 2,967,699 A | * | 1/1961 | Brown | 261/114.1 |
| 3,069,042 A | * | 12/1962 | Johnston | 220/592.09 |

(Continued)

FOREIGN PATENT DOCUMENTS

DE    19740471 C1    2/1999

(Continued)

OTHER PUBLICATIONS

The Montana Water Center. "Ground Water Manual for Small Water Systems". Montana State University. Jan. 1999, p. 7-10.*

(Continued)

*Primary Examiner*—Anthony Stashick
*Assistant Examiner*—Robert J Hicks
(74) *Attorney, Agent, or Firm*—Haynes and Boone, LLP

(57) ABSTRACT

A storage vessel for storing a fluid substance,
said storage vessel including a plurality of abutting individually sealed storage chambers, each chamber capable of withstanding super atmospheric pressure, with adjacent chambers forming at least one fluid passageway therebetween,
characterised in that at least one said chamber includes an external peripheral seal configured to be relatively weaker than the remainder of said vessel.

17 Claims, 2 Drawing Sheets

U.S. PATENT DOCUMENTS

| | | | | |
|---|---|---|---|---|
| 3,122,259 | A | * | 2/1964 | Meesen .................. 220/560.07 |
| 3,338,238 | A | | 8/1967 | Warncke |
| 3,732,690 | A | * | 5/1973 | Meijer ..................... 60/39.465 |
| 3,895,152 | A | * | 7/1975 | Carlson et al. .............. 428/116 |
| 3,951,362 | A | * | 4/1976 | Robinson et al. ............. 410/68 |
| 4,498,261 | A | | 2/1985 | Wilson et al. |
| 4,777,974 | A | * | 10/1988 | Swift et al. .................. 137/14 |
| 4,923,095 | A | | 5/1990 | Dorfman et al. |
| 4,930,650 | A | * | 6/1990 | Wells ......................... 220/507 |
| 4,932,403 | A | | 6/1990 | Scholley |
| 4,946,056 | A | | 8/1990 | Stannard |
| 5,311,750 | A | | 5/1994 | Stark |
| 5,346,371 | A | * | 9/1994 | Bialy et al. ................. 417/312 |
| 5,398,839 | A | * | 3/1995 | Kleyn ..................... 220/560.03 |
| 5,438,597 | A | * | 8/1995 | Lehnert et al. .............. 376/272 |
| 5,960,981 | A | * | 10/1999 | Dodson et al. ............. 220/563 |
| 6,029,933 | A | * | 2/2000 | Holman et al. ........... 244/118.5 |
| 6,095,367 | A | | 8/2000 | Blair |
| 6,412,650 | B1 | | 7/2002 | Warner |
| 6,457,636 | B1 | * | 10/2002 | Van de Ven et al. ..... 229/122.32 |
| 6,595,382 | B2 | * | 7/2003 | Ettlinger ................. 220/560.11 |
| 6,612,092 | B1 | * | 9/2003 | Mabru et al. ................ 52/789.1 |
| 6,634,421 | B2 | | 10/2003 | Ognibene et al. |
| 6,742,554 | B1 | * | 6/2004 | Immel ......................... 141/286 |

FOREIGN PATENT DOCUMENTS

| | | | |
|---|---|---|---|
| DE | 101 03 149 | A1 | 8/2002 |
| FR | 2671542 | A | 1/1992 |
| FR | 2781431 | A | 1/2000 |
| FR | 2781555 | A | 1/2000 |
| WO | WO 96/23721 | A1 | 8/1996 |
| WO | WO 00/05535 | A1 | 2/2000 |
| WO | WO 01/95966 | | 12/2001 |

OTHER PUBLICATIONS

Examination Report, mailed Oct. 4, 2005, Intellectual Property Office of New Zealand.
International Search Report, mailed Dec. 3, 2004, Australian Patent Office.
European Search report: EP 04077446.5; Feb. 26, 2009.
Chinese Appl. No. 200480023645.1 First office action dtd Jun. 1, 2007.
Chinese Appl. No. 200480023645.1 Response to First office action.
Chinese Appl. No. 200480023645.1 Second office action dtd Mar. 28, 2008.
Chinese Appl. No. 200480023645.1 Response to Second office action.
European Appl. No. EP 2004-00077446.5 First Office action dtd Feb. 26, 2009.
European Appl. No. EP 2004-00077446.5 Response to First Office action.
European Appl. No. EP 2004-00077446.5 Second Office action dtd Sep. 11, 2009.
European Appl. No. EP 2004-00077446.5 Response to Second Office action.

* cited by examiner

STORAGE VESSEL CHAMBER FOR STORING FUELS SUCH AS HYDROGEN

CROSS-REFERENCE TO OTHER APPLICATIONS

This Application claims priority from New Zealand Patent Application No. 527968 filed on Sep. 1, 2003.

TECHNICAL FIELD

This invention relates to a storage vessel and in particular a vessel for storing a combustible fuel.

BACKGROUND ART

A number of storage vessels for combustible fuel are known.

Fuel is commonly stored as a compressed gas or in a liquefied form in a pressurised cylinder. Conventional cylinders typically consist of a single chamber and are designed to be resistant to puncture from minor impacts, but generally are not designed to withstand serious trauma.

When the fuel is in a liquid form, the storage vessel may have a series of baffles to prevent the motion of the liquid from unbalancing the vessel during movement. However, such baffles typically do not increase the ability of the vessel to withstand serious impacts.

A single chamber design does not exert any control over the release of fuel when such storage vessels are punctured, typically resulting in an explosive release of pressurised fuel from the vessel.

In the presence of a flame or spark, the sudden release of large quantities of fuel may result in a high speed fireball. Alternatively, a flame could burn back into the vessel, exploding the remaining fuel content and vessel and creating a serious hazard from flying shrapnel.

The move towards the use of alternative fuels other than hydrocarbons has also increased the need for inherently safe storage vessels for highly flammable fuels in automobiles, trucks and buses (hereafter referred to as automobiles).

A number of vessels have been designed to store fuels such as hydrogen. To date, many of these have been based on the use of alloys which chemically absorb hydrogen into a matrix. Under certain controlled conditions these alloys release hydrogen, available for fuel. However, these alloys require one set of controlled conditions for absorption of the fuel and another for releasing the fuel. As such, the complexity of these devices makes them expensive and not suitable for use for small storage situations such as automobiles.

Further, in the event that an automobile is involved in a collision it is possible the storage vessel will be subjected to a violent impact. It is essential that any emission of the vessel contents be released in a controlled manner to prevent an explosion.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

It is an object of the present invention to address the foregoing problems or at least to provide the public with a useful choice.

Further aspects and advantages of the present invention will become apparent from the ensuing description which is given by way of example only.

DISCLOSURE OF INVENTION

According to one aspect of the present invention there is provided a storage vessel for storing a substance, the storage consisting of a plurality of individual storage chambers assembled so as to be capable of withstanding pressures greater than atmospheric, wherein the substance can move from one chamber to another and wherein the configuration of the chambers creates a circuitous path that restricts the rate of flow of the substance through the storage vessel, wherein each individual storage chamber is sealed with a peripheral seal.

Consequently, in the event of a traumatic impact, said seal is more likely to fail or crack than any other portion of said vessel, constricting fluid egress to said failed seal.

Preferably, the chambers are substantially plate-like, formed from a pair of spaced-apart, substantially coterminous, planar panels peripherally joined by a said seal.

Preferably, said panels are spaced apart by mutual contact between a plurality of surface features extending laterally from at least one, but preferably both, confronting panel surface(s) between said adjacent panels.

In some embodiments fluid passageways between adjacent chambers and/or said surface features provide a circuitous fluid path attenuating fluid flow volume between chambers and/or through any failed peripheral seal.

In preferred embodiments of the present invention the fluid substance may be any flammable liquid or gas substance such as a combustible fuel, preferably hydrogen. However, this should not be seen as a limitation for it is envisaged that the storage device could be used for other combustible fuels including hydrocarbons such as compressed natural gas or liquefied petroleum gas.

It is also anticipated the storage vessel of the present invention could be used to store other substances such as toxic chemicals, where in the event of a seal rupture, a controlled rate of fluid egress allows any personnel in the vicinity sufficient time to evacuate.

When the vessel is intended to store hydrogen in an automobile, it is anticipated cryogenic conditions and/or high pressure will likely be required during filling and storage.

It is further anticipated that other substances will have differing storage requirements and the storage vessel can be configured accordingly.

For ease of reference throughout the specification, the substance will hereinafter be referred to as a fuel, though it will be appreciated this is for exemplary purposes only and is not limiting.

Preferably the panel walls of each chamber are formed from materials resistant to corrosion, weight saving, and/or for ease of construction such as stainless steel, titanium or a copper-nickel alloy. Further examples of such materials include other metal alloys, carbon fibre and/or metal/carbon fibre composites.

The dimensions of each chamber (and consequently the entire vessel) will be dependent on the identity of the fuel, the volume of fuel required to be stored and the space available in the automobile.

In one preferred embodiment of the present invention the storage vessel is portioned into individual storage chambers by assembling a plurality of panels together to form an integral vessel.

Preferably each panel has one or more openings to permit the passage of fuel and fuel vapour between adjacent chambers and/or permit venting between adjacent chambers.

In preferred embodiments of the present invention the fluid passageways between adjacent chambers are offset in relation to each other within said chamber. Preferably, adjacent chambers include at least two fluid passageways, permitting the simultaneous movement of a settled liquid through a first fluid passageway and a gas or vapour through as second fluid passageway.

In this way the fuel flow path and/or the venting flow path can be directed (taking account of the eventual the orientation of the storage vessel when installed in an automobile) in accordance with the requirements of effective operation.

In these embodiments the fuel will be required to follow a circuitous route between the chambers of the vessel, thus restricting and controlling the flow of fuel through the vessel.

In other embodiments the flow of fuel through the chambers may occur through a plurality of openings, wherein the passage of the fuel is restricted by one and or both the diameter and the position of the openings in one plate in relation to the openings in adjacent plates. Under all circumstances it is foreseen that the position of openings in plates is such as to ensure a circuitous flow of fuel through the chambers, thereby limiting the fuel's flow rate.

Preferably, said surface features extending laterally from a panel surface(s) are corrugations.

In preferred embodiments the storage vessel may be configured such that the longitudinal axis of the corrugations on adjacent panels are angled in opposing directions, creating a plurality of contact points between adjacent plates.

While a variety of other forms of corrugation can also be effective, In preferred embodiments, the corrugations are arranged in a chevron, or herringbone pattern.

For example other corrugations may be selected from a list including regular corrugations, irregular corrugations, irregular and/or irregular shapes, projections or protrusions including saw-tooth, castellations, washboard corrugations and/or sinusoidal extrusions.

Such contact points between the panels also serve to further create a circuitous path, providing a further control on the rate at which fuel can move through the storage vessel.

Configuring the corrugations to provide multiple contact points offers rigidity to both the individual plates and also to the storage vessel. This not only allows the vessel to withstand the pressure of the stored product, but creates a circuitous path for the flow of fuel through the vessel and ensures the plates are not crushed when the plates are assembled together into the storage vessel.

According to another aspect of the present invention there is provided a method of assembling a storage vessel substantially as described above, characterised by the steps of i) abutting a plurality of panels together in mutual contact between a plurality of surface features extending laterally from at least one confronting panel surface between adjacent panels, ii) assembling the panels together to form a plate pack, with adjacent panels forming at least one fluid passageway therebetween and ii) sealing the periphery of adjacent panels in the plate pack with a seal to form a plurality of sealed abutting chambers, interconnected by said fluid passageway(s).

In preferred embodiments the panels may be assembled by clamping together between two end panels using fasteners, to form the plate pack. However it will be appreciated that different configurations may be used and as such this should not be viewed as a limitation.

The use of multiple plates means each chamber of the storage vessel is in effect a single pressure vessel.

To prevent release of pressure from the storage vessel, the chamber may preferably be sealed by a peripheral seal such as a gasket of an elastomeric material, or if required a chemically inert material such as an inert compressed cemented fibre.

Alternatively, the seal between individual adjacent panels may be formed by being welded or brazed together (if the panels are metal) or alternatively sealed with a suitable adhesive or bond, to form a plate pack. In a further embodiment, the seal may be provided by fusing the periphery of adjacent plates.

Once again, the method of construction and sealing techniques will preferably be chosen to be compatible with the characteristics of the stored fuel.

For example, filling and storage of the vessel under cryogenic conditions will require different methods of construction and materials than those required for the storage of other substances.

Preferably, the plate pack can be assembled as an integral unit, complete with connections (inlet and outlet valves, vent and drain) before being clamped between the rigid end plates.

Multiple fasteners may be used to tighten the pack, ensuring the whole assembly is pressure tight.

Having a large number of panels stacked closely together increases the resistance of the storage vessel to puncture.

The present invention thus provides a storage vessel suitable for storing a combustible fuel under high pressure in a way that is essentially inherently safe, safety being enhanced by four key features: multiple chamber design with individual peripheral seals, a circuitous fuel path, rigidity, and resistance to puncture.

In the event that an automobile carrying such a storage vessel is involved in a collision and the storage vessel subjected to a violent impact, the vessel is designed so that the contents of the vessel are released in a controlled manner.

In the event that a combustible material such as hydrogen is carried and one or more of the peripheral seals around each pair of plates (or effectively around each chamber) is ruptured or otherwise damaged, the contents of that chamber will escape to the atmosphere.

Because the configuration of the storage vessel provides a high degree of resistance to puncture, it is likely that any breach of the vessel will arise through cracking of the peripheral seals.

As each chamber only holds a limited amount of fuel, the remaining fuel is forced to traverse said circuitous route between chambers to escape through any seal failure, thus controlling the escape of fuel from the vessel.

As any failure under impact is likely to be by way of cracking of the peripheral seals rather than by holes being torn out of the plate pack, the controlled release of product to the atmosphere will likely be at a relatively low flow rate at a high velocity through the crack.

The result is a controlled release of fuel, which while posing a threat through ignition in the atmosphere does not result in a chaotic uncontrolled release of fuel, thus reducing the risk of a fireball exploding away from the breached vessel.

The release of fuel from a peripheral crack will be at a high velocity due to the super atmospheric pressure of the stored fuel. The high velocity of release substantially prevents the fuel being able to burn on the surface of the vessel, reducing the risk of the fuel burning back into the vessel and resulting in an explosive release which would result in the catastrophic failure of the vessel and present a hazard to bystanders.

As the vessel typically will contain fuel under high pressure, the escape velocity from any breach through a failed seal will exceed the ignition velocity of even a highly combustible fuel.

Provided the escape velocity exceeds the ignition velocity, the escaping fuel is prevented from burning on the surface of the vessel.

Because of the corrugated design of the panels and the relatively narrow spacing of the multiple chambers, fuel escaping through a cracked seal or even multiple cracked seals would have to travel through a circuitous path involving high pressure loss through one or more of several chambers.

While a conventional single chamber pressure vessel is able to be punctured by an automobile accident, the nature of this design and the multiple chambers means such puncture is not likely.

In the event that a conventional single chamber storage vessel is punctured, it is impossible to control the release of product and thus the build up of escape velocity could easily overstress the material of construction and result in a sudden and catastrophic failure. The presence of a flame or spark in the vicinity will cause the fuel to ignite and form a high speed fireball with severe risk to people in the vicinity.

In the event a flame is drawn back into the vessel, the explosion and fireball could also carry pieces of the disintegrating vessel (shrapnel) with even greater risk to people in the vicinity.

The present invention provides for a multiple chamber design, the walls of each chamber having a plurality of surface features such as corrugations with a multiplicity of contact points when assembled. Such provision confers high rigidity to the vessel, preventing holes being punctured in the vessel when impacted and only allowing the cracking of peripheral seals to occur. Thus, upon breaching, the rate of flow of fuel being released into the environment is limited.

It will be appreciated that the plurality of surface features need not be corrugations, but may include any regular or irregular pattern or configuration, providing a tortuous or circuitous fluid path between adjacent confronting panel surfaces.

It is anticipated that the controlled release of fuel, even at a high velocity, from the storage vessel of the present invention will minimise the risk of explosion from an impact. It is acknowledged there remains a risk of the released fuel adding to other fuel elements in the environment and helping to sustain a fire. However, release from the storage vessel would not result in an explosion, nor a fireball moving at high speed. Moreover, because the present invention is very unlikely to disintegrate, there is little danger posed to bystanders from exploding shrapnel.

The present invention also encompasses methods for filling a storage vessel, in addition to automobiles including said storage vessel, substantially as described herein.

BRIEF DESCRIPTION OF DRAWINGS

Further aspects of the present invention will become apparent from the following description which is given by way of example only and with reference to the accompanying drawings in which.

BEST MODES FOR CARRYING OUT THE INVENTION

Figure 1:
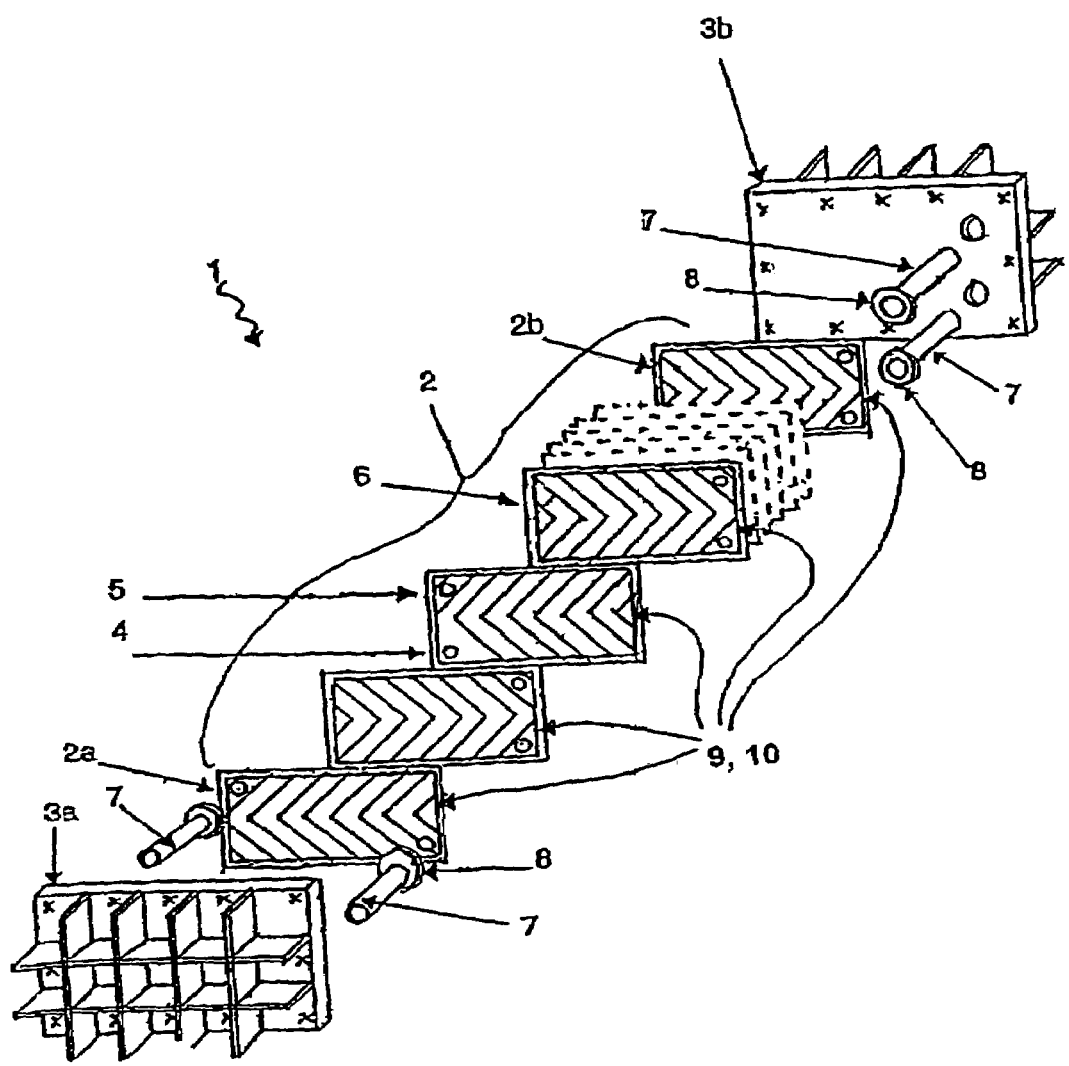
FIG. 1 shows an exploded view of one aspect of the present invention.

With reference to the Figures, there is provided a multiple chamber storage vessel (1) for the storage of a fluid substance including liquid or gaseous fuel.

The vessel (1) consists of a plurality of intermediate panels (2) assembled together, sealed and clamped together between two end panels (3a, 3b).

Each plate (2) has at least one fuel opening (4) and a vent opening (5). The fuel opening (4) is designed to allow the flow of fuel through the vessel (1). The opening (5) is preferably located at the top to purge any remaining vapour or fuel during filling of the vessel (1).

The vessel also includes a first panel (2a) and a last panel (2b). These panels (2a, 2b) are of a different configuration to the other panels (2) to facilitate the connection of the vessel (1) to fuel lines of an automobile to allow the filling, emptying and venting of the vessel.

The panels (2) preferably have a corrugated design, which may be in the form of a chevron or herringbone pattern (6) which provides the desired characteristics of determination of the plate spacing, a substantially circuitous fuel flow path, and/or enhanced rigidity of the present invention.

The pattern illustrated is a "V" or chevron or herringbone design. This pattern provides one of many possible configurations capable of providing a multiplicity of contact points between the plates. Other corrugated, or other regular non-corrugated, and/or irregular pattern configurations may also be used.

In use, the direction of the corrugated pattern (6) preferably alternates plate by panels (2) to give multiple contact points which is part of how rigidity is achieved.

The partitions are preferably sealed and clamped together between two end panels (3a & 3b) and tightened with a plurality of tightening bolts. The inlet, outlet drain and vent holes can be fitted with valves and the vessel can be installed at any preferred angle.

The end plates (3a & 3b) are reinforced with cross webbing on the outside to enhance their pressure retaining ability while saving weight.

The vessel (1) also includes a plurality of inlet and outlet conduits (7) which pass through the two end panels (3a and 3b). The conduits (7) have an inner flange (8) which can be sealed against the first and last panels (2a, 2b) using a gasket, by bonding or seal welding or brazing.

Figure 2:
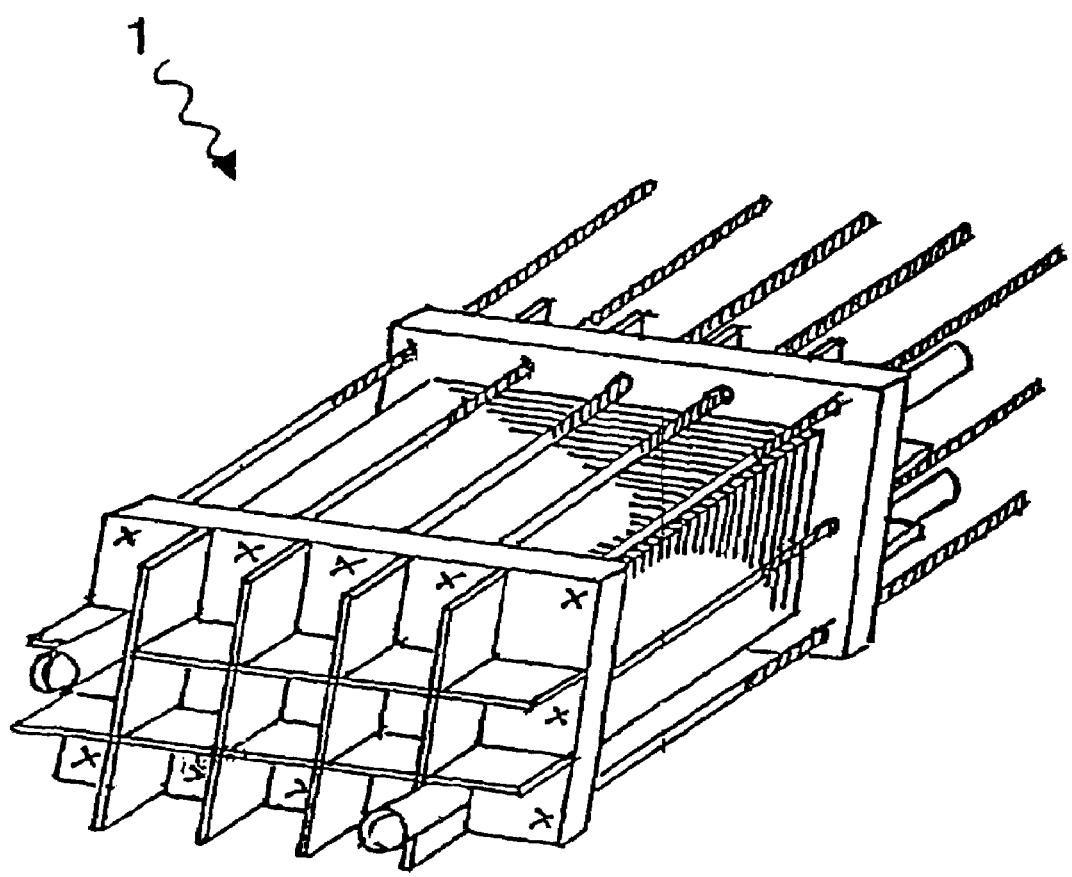
FIG. 2 shows an assembled version of one aspect of the present invention.

In the embodiment shown, each panels (2) is formed with a groove (9) located along each side at the periphery of plate (2). Adjacent panels (2) are individually sealed about their peripheral edge by a seal (10) used in combination with groove (9) in one of several methods. The seal (10) may consist of gasketing, adhesive, bonding, brazing, fusion and/or welding material which is placed in the groove (9) between adjacent panels (2). In the embodiment depicted in FIGS. 1-2, in the corrugations (6) terminate a short distance from the peripheral edge of the panel (2). This facilitates sealing of the panels (2) by provision of a straight peripheral groove (9) to the seal (10). Consequently, a more even sealing effect may be achieved, particularly if the seal (1) involves brazing or the like. In alternative embodiments (not shown), the groove (9) may be omitted, or the peripheral edge of the panels (2) may be differently configured, e.g. with the corrugations (6) extending to the edge of the panel (2). Depending on the choice of seal (10), some further treatment (for example heat treatment) of the assembled plate pack may be required and this treatment may be effected under special conditions (for example under pressure and/or in an inert atmosphere) according to the specifics of the materials involved.

Aspects of the present invention have been described by way of example only and it should be appreciated that modifications and additions may be made thereto without departing from the scope thereof as defined in the appended claims.

What I claim is:

1. A storage vessel for storing a substance, the storage vessel comprising:
   a plurality of individual storage chambers assembled so as to be capable of withstanding pressures greater than atmospheric,
   wherein at least a first individual storage chamber is adjacent to a second individual storage chamber, thereby creating at least first and second adjacent chambers, and
   the first and second adjacent storage chambers are each formed from a pair of plates, the pair of plates being spaced apart a predetermined distance by a plurality of surface features extending from at least one surface of at least one of the pair of plates, the surface features creating a circuitous fluid flow path that restricts a rate of flow of the substance through the storage vessel;
   a peripheral seal, the peripheral seal being formed along a periphery of at least one of the pair of plates in at least one of the plurality of individual storage chambers and joining the pair of plates to form the at least one of the plurality of individual storage chambers, wherein the peripheral seal is formed to fail or crack prior to a remainder of the vessel in an impact; and
   at least one passageway between the first adjacent chamber and the second adjacent chamber, allowing the substance to move from the first adjacent chamber to the second adjacent chamber.

2. The storage vessel as claimed in claim 1 wherein the substance is a flammable liquid or gas substance.

3. The storage vessel as claimed in claim 1 wherein the substance is a combustible fuel.

4. The storage vessel as claimed in claim 3 wherein the substance is compressed hydrogen gas.

5. The storage vessel as claimed in claim 3 wherein the substance is liquefied hydrogen.

6. The storage vessel as claimed in claim 3 wherein the substance is a compressed hydrocarbon gas.

7. The storage vessel as claimed in claim 3 wherein the substance is a liquefied hydrocarbon gas.

8. The storage vessel as claimed in claim 1 wherein each of the individual storage chambers are formed by assembling a plurality of plates together to form an integral vessel.

9. The storage vessel as claimed in claim 1 wherein the at least one passageway further allows venting between the first and second adjacent chambers.

10. The storage vessel as claimed in claim 9 wherein the at least one passageway between the first and second adjacent chambers are offset in relation to at least one passageway between the second and third adjacent chamber.

11. The storage vessel as claimed in claim 10 wherein the first and second adjacent chambers include at least two passageways therebetween, permitting the movement of a settled liquid through a first passageway and a gas or vapour through a second passageway.

12. The storage vessel as claimed in claim 1 wherein said plurality of surface features extend from a first and a second opposing plate surface and are corrugations.

13. The storage vessel as claimed in claim 12 wherein the corrugations extending from the first opposing plate surface are angled in opposing directions to the corrugations extending from the second opposing plate surface, creating a plurality of contact points between the plurality of surface features.

14. The storage vessel as claimed in claim 12 wherein the corrugations are arranged in a pattern chosen from chevron and herringbone.

15. The storage vessel as claimed in claim 1 wherein the surface features are selected from regular corrugations, irregular corrugations, regular shapes, irregular shapes, and projections or protrusions including saw-tooth, castellations, washboard corrugations and sinusoidal extrusions.

16. The storage vessel as claimed in claim 15 wherein the surface features terminate at a distance from the peripheral edge of the plate.

17. The storage vessel as claimed in claim 15 wherein the surface features extend to the peripheral edge of the plate.

* * * * *